Dec. 26, 1950      E. C. MALVIN      2,535,940

SAFETY SWITCH FOR HYDRAULIC BRAKES

Filed Nov. 2, 1949

Inventor

Elmer C. Malvin

By *Clarence A. O'Brien*
and *Harvey B. Jacobson*
Attorneys

Patented Dec. 26, 1950

2,535,940

UNITED STATES PATENT OFFICE 2,535,940

SAFETY SWITCH FOR HYDRAULIC BRAKES

Elmer C. Malvin, Cumberland, Ohio, assignor of twenty-five per cent to Frank E. Wilson and twenty-five per cent to Clarence L. Wilson, both of Zanesville, Ohio Application November 2, 1949, Serial No. 125,115

8 Claims. (Cl. 200—82)

This invention relates to hydraulic brake systems, and more particularly to an automatic safety check valve for vehicle brakes of the hydraulic type.

An object of the invention is to provide a safety device adapted to be inserted in the hydraulic brake system of an automobile or the like to automatically check the escape of hydraulic fluid when the brake pedal is depressed in the event that a leak occurs between the safety device and the brake.

Another object of the invention is to provide a signal device adapted to be actuated by the safety device to inform a driver of the existence of a leak in the hydraulic brake system equipped with the novel safety device.

Since in conventional hydraulic brake systems used on automobiles, when a leak occurs in a brake line, the entire system will become inoperative from the loss of fluid leaking through the break in the brake line, it is another object of this invention to automatically signal where the break is while providing means for preventing uncontrolled leakage of hydraulic fluid.

Still further objects of the invention are the provision of a safety device for a hydraulic brake system that is strong, durable, highly efficient in operation, comparatively simple in construction and manufacture, easy to install, and comparatively inexpensive.

These, together with the various ancillary objects of the invention which will become apparent as the following description proceeds, are attained by this safety device, a preferred embodiment of which has been illustrated in the accompanying drawings, by way of example only, wherein.

Figure 1:
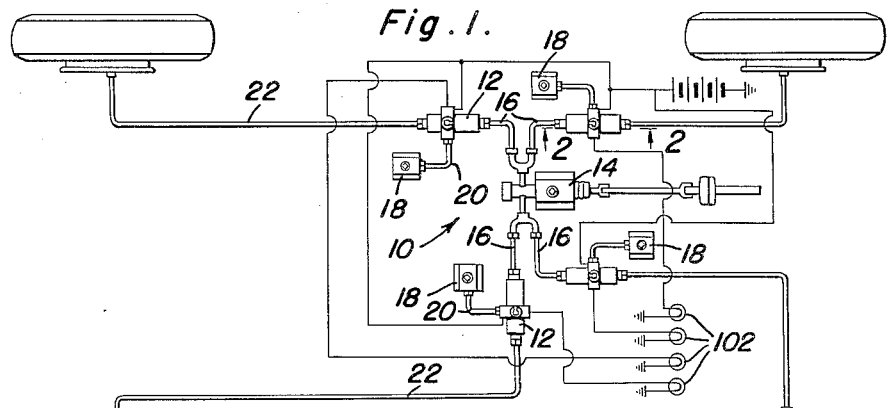
Figure 1 is a schematic view showing how the safety device is inserted in a hydraulic system and showing a circuit attachment to operatively connect the safety device to signal lights on the dashboard of the automobile.

With continued reference to the accompanying drawings wherein like reference numerals designate similar parts throughout the various views, the reference numeral 10 is used to generally designate an hydraulic brake system for an automotive vehicle which employs the novel safety device generally indicated by the reference numeral 12. Each of the safety devices 12 is connected to the master cylinder 14 by means of suitable conduits 16. Separate hydraulic fluid reservoirs 18 are provided and are connected to the safety devices by means of conduits 20. The outlet lines 22 are thence operatively connected, as in conventional brake systems, to the operating mechanism of the brakes.

Each of the conduits 16, 20 and 22 is provided with a peripheral flange at their joining ends so that plugs 24, 26, and 28 may engage and hold the conduits securely when threadedly engaged within suitable threaded recesses in the casing 30 of the present device.

The air bubbles within the hydraulic fluid entering through conduit 16 and passageway 32 in the casing are bled by use of the air vent 34 which is screw controlled. The fluid exerts pressure against a rubber cup 38, screwed as at 40, or elsewise secured to a piston 42 slidably mounted within the casing 30. The piston 42 has a cylindrical extension thereof 44 which is provided with a recess 46 therethrough and is additionally provided with a transversely extending slot 48. Formed on the exterior face of the piston is a lock ring 50 having a cam-like surface 52 formed integral with the extension 44 of the piston. Threadedly secured to the casing 30 and a perforated plate 54 positioned transversely of the opening 56 in the casing in communication with the conduit 20 is an anchor pin 58 which is received within the recess 48 in the piston extension. Coil spring 60 biases the piston 42 and the anchor pin 58.

Figure 2:
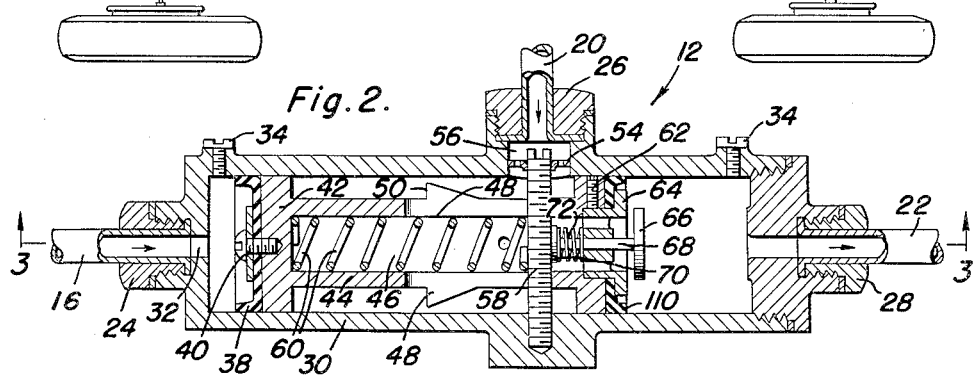
Figure 2 is a sectional view as taken along line 2—2 in Figure 1, and being shown in an enlarged scale to clearly illustrate the various details of the invention.

By means of set screw 62, a valve seat member 64 is rigidly held in place in a suitable recess in the piston. A valve member 66 is slidably positioned within the valve seat member and is provided with a stem 68 connected to a plate 70 which is urged against the anchor pin 58 by spring 72. As can be seen best in Figures 2 and 3, the valve seat member 64 is provided with an annular passageway for hydraulic fluid which is broken only by the webs used to connect the central portion in which the valve 66 has its stem 68 slidably emplaced.

Figure 3:
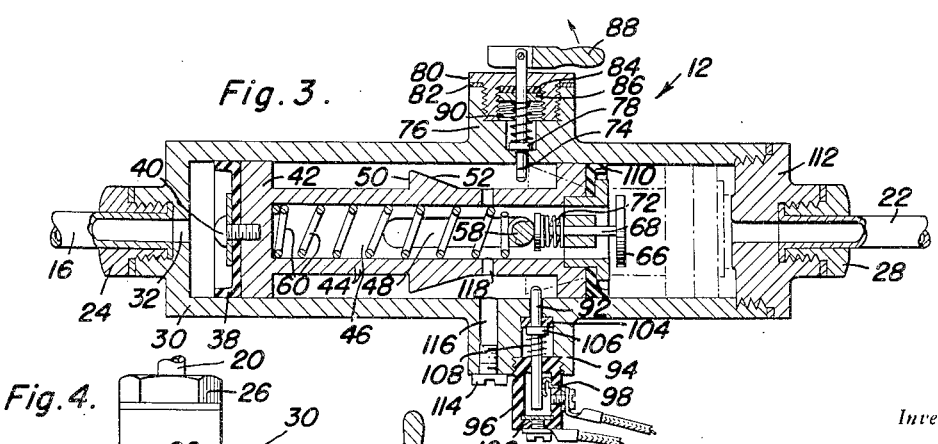
Figure 3 is another sectional view as taken along line 3—3 of Figure 2 and being drawn in the same scale to show the relationship of the elements of the safety device.
Figure 4:
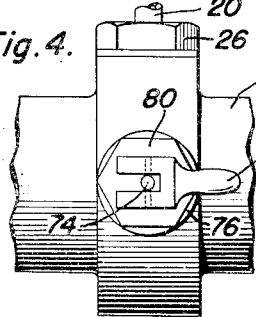
Figure 4 is a sectional elevational view showing the resetting lever comprising one element of the present invention in greatest detail.
Figure 5:
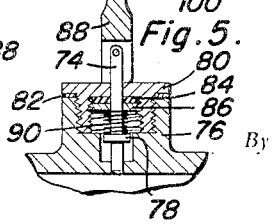
Figure 5 is a sectional detail of a small portion of the present invention showing the resetting lever in one of its selected operating positions.

Referring now more particularly to Figures 3, 4 and 5, there will be seen a stop pin 74 slidably mounted within an annular projection 76 integrally connected to the casing 30 and rising therefrom. The stop pin 74 has a stop disk 78 connected thereto. An internally and externally threaded packing gland 80 is threadedly engaged within the extension 76 and in cooperation with the paper seal 82, a soft rubber packing ring 84, and the slotted and threaded metal washer 86 provides a liquid-tight seal for the pin stop means. An operating lever 88 is pivotally connected to the pin 74 at its upper end thereof. The metal washer 86 is slotted so as to be engageable by a screwdriver for insertion into place. A coil spring 90 is provided to continuously bias the stop pin 74 into its downwardmost position.

Another pin 92 is slidably mounted within another integrally formed projection 94 on the casing 30. Threaded within the projection 94 is a signal block 96 into which the pin 92 has its outermost end extend. A pair of contacts 98 and 100 are provided for selective actuation of the signal lights 102 which are connected to an individual safety device 12. A locking seal 104 is provided and is engaged by the bearing disk 106 to limit the inward motion of the pin 92. Spring 108 is provided to continuously bias the disk 106 so that the pin 92 may remain in its uppermost position at all times when not actuated.

Other elements of the invention include a rubber cup 110 secured to the piston 44. Additionally, the casing is formed with a threaded removable end 112 for ease of assembly and is additionally provided with a screw cap sealed aperture 114 for assembly purposes.

The device is operated as follows: During normal operation pressure is applied from the master cylinder 14 to the piston 42 through conduit 16, causing the piston to move ahead. When the piston moves forward, the spring 60 is compressed and spring 72 expands, closing valve 66 against valve seat 64. Thus, fluid will be forced through the conduit 22 to the operating mechanism of the brakes. When released, the piston will return to its original position by expansion of the spring 60.

In case of rupture of the conduit 22 to the brakes, the pressure of the hydraulic fluid will cause the piston to move ahead, but as the piston cannot build up the pressure through conduit 22, it will move ahead an excessive distance, causing the lock pin 74 to ride up cam surface 52 and lock therebehind, as is shown in dotted lines in Figure 3. Additionally, signal pin 92 will ride upon the cam surface and be depressed so as to close a circuit between contacts 98 and 100 which are otherwise suitably insulated from each other. Accordingly, a signal will be shown by the bulb 102 on the dashboard, indicating which line 22 has a rupture therein. Furthermore, the valve 66 will rest and be seated against valve seat 64, thus preventing the hydraulic fluid from the master cylinder 14 or through the auxiliary reservoirs 18 to pass through the conduit 22 and out of the ruptured point. This will cut out merely the break at the end of the ruptured conduit and allow the rest of the system to work normally. Since the space around the piston and piston extension is always full of fluid, the cups 38 and 110 will always be firmly seated. However, if a brake goes out of adjustment, the signal light will flash and give ample warning before the piston locks.

In order to unlock the piston from its position after the rupture in the brake line has been corrected, it is merely necessary to raise the operating lever 88 so as to raise the pin 74 from behind the lock ring 50, which will cause the spring 60 to return the piston to its normal position. Then the lever merely need be depressed to set the device.

To assemble the device, it is merely necessary to remove the cap screw 114 from the casing. The spring 60 is placed in the piston extension 44 and the entire piston assembly can then be placed within the casing. The valve and valve seat have been screwed in previously. By placing a small threaded pin (not shown) through the aligned apertures 116 and 118 in the casing and piston extension, respectively, the spring will be held in a compressed position. Then the anchor pin can be readily positioned within the slot. Subsequently, the small threaded pin holding the spring 60 may be withdrawn by inserting a female threaded pin through the hole 116 and screwing it thereon, then withdrawing the combined pins. Cap 114 is then placed in the hole 60 to prevent leakage.

Since, from the foregoing, the construction and advantages of this device are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be resorted to which fall within the scope of the appended claims.

Having described the invention, what is claimed as new is:

1. A safety device for an hydraulic brake system comprising a tubular casing, a piston slidably mounted in said casing, said piston having an extension attached thereto, said extension having a recess therein open at one end thereof, a transverse slot in said extension open at said one end and communicating with said recess, an anchor pin rigidly secured transversely of said casing and positioned within said slot, a lock ring on said extension, and stop means secured in said casing selectively engaging said lock ring.

2. A safety device for an hydraulic brake system comprising a tubular casing, a piston slidably mounted in said casing, said piston having an extension attached thereto, said extension having a recess therein open at one end thereof, a transverse slot in said extension open at said one end and communicating with said recess, an anchor pin rigidly secured transversely of said casing and positioned within said slot, a lock ring on said extension, stop means secured in said casing selectively engaging said lock ring, means biasing said piston from said anchor pin, valve seat means secured to said extension, a valve member slidably mounted in said valve seat means, and means urging said valve member against said valve seat means.

3. A safety device for an hydraulic brake system comprising a tubular casing, a piston slidably mounted in said casing, said piston having an extension attached thereto, said extension having a lock ring thereon, a pin slidably secured transversely of said casing, stop means secured in said casing selectively engaging said lock ring, said lock ring having a cam engaging surface thereon, said pin means selectively closing an electric contact to a signal light when depressed through contact with said cam engaging surface when said stop means engages said lock ring.

4. The structure of claim 3 including a transverse slot in said extension open at one end and communicating with a recess in said extension, and an anchor pin rigidly secured transversely of said casing and positioned within said slot.

5. The structure of claim 4 including means biasing said piston from said anchor pin, valve seat means secured to said extension, a valve member slidably mounted in said valve seat means, and means urging said valve member against said valve seat means.

6. The structure of claim 5 including lever means connected to said stop means, said lever means being selectively actuated to withdraw said stop means from engagement with said lock ring.

7. A safety device for an hydraulic brake system adapted to be inserted in a fluid conduit line comprising a casing having an inlet and outlet tube connected thereto in communication with the hollow interior of said casing, a piston slidably mounted in said casing, said piston having a cylindrical extension attached thereto, said extension having a recess therein open at one end thereof, a transverse slot in said extension open at one end and communicating with said recess, an anchor pin rigidly secured transversely of said casing and positioned within said slot, a lock ring on said extension, and stop means secured in said casing selectively engaging said lock ring.

8. A safety device for an hydraulic brake system adapted to be inserted in a fluid conduit line comprising a casing having an inlet and outlet tube connected thereto in communication with the hollow interior of said casing, a piston slidably mounted in said casing, said piston having a cylindrical extension attached thereto, said extension having a recess therein open at one end thereof, a transverse slot in said extension open at one end and communicating with said recess, an anchor pin rigidly secured transversely of said casing and positioned within said slot, a lock ring on said extension, stop means secured in said casing selectively engaging said lock ring, means biasing said piston from said anchor pin, valve seat means secured to said extension, a valve member slidably mounted in said valve seat means, and means urging said valve member against said valve seat means.

ELMER C. MALVIN.

REFERENCES CITED

The following references are of record in the file of this patent:

UNITED STATES PATENTS

| Number | Name | Date |
| --- | --- | --- |
| 1,593,222 | Russell | July 20, 1926 |
| 2,024,042 | Jance | Dec. 10, 1935 |
| 2,127,849 | Stone | Aug. 23, 1938 |
| 2,253,580 | Rahe | Aug. 26, 1941 |